US012155672B2

(12) United States Patent
Dammann (10) Patent No.: US 12,155,672 B2
(45) Date of Patent: Nov. 26, 2024

(54) METHOD FOR CREATING AN ELECTRONIC MESSAGE THE INTEGRITY OF WHICH IS GUARANTEED AND VERIFIABLE ACCORDING TO THE MIME STANDARD

(71) Applicant: MAILSTONE, Aix en Provence (FR)

(72) Inventor: Franck Dammann, Aix en Provence (FR)

(73) Assignee: MAILSTONE, Aix en Provence (FR)

( * ) Notice: Subject to any disclaimer, the term of this patent is extended or adjusted under 35 U.S.C. 154(b) by 304 days.

(21) Appl. No.: 17/635,024

(22) PCT Filed: Jul. 31, 2020

(86) PCT No.: PCT/EP2020/071670
§ 371 (c)(1),
(2) Date: Feb. 14, 2022

(87) PCT Pub. No.: WO2021/028241
PCT Pub. Date: Feb. 18, 2021

(65) Prior Publication Data
US 2022/0294804 A1    Sep. 15, 2022

(30) Foreign Application Priority Data
Aug. 12, 2019  (FR) .................................. 1909145

(51) Int. Cl.
*H04L 9/40*        (2022.01)
*H04L 9/00*        (2022.01)
(Continued)

(52) U.S. Cl.
CPC .............. *H04L 63/123* (2013.01); *H04L 9/50* (2022.05); *H04L 51/18* (2013.01); *H04L 51/48* (2022.05)

(58) Field of Classification Search
None
See application file for complete search history.

(56) References Cited

U.S. PATENT DOCUMENTS 10,135,609 B2 *  11/2018  Bibera ................ G06F 16/2365
10,305,833 B1 *   5/2019  Dennis ...................... H04L 9/16
(Continued)

OTHER PUBLICATIONS

International Search Report issued in corresponding application No. PCT/EP2020/071670, dated Oct. 19, 2020.

*Primary Examiner* — Backhean Tiv
(74) *Attorney, Agent, or Firm* — Murtha Cullina, LLP (57) ABSTRACT

The invention relates to a method for creating, and guaranteeing the integrity of electronic messages, within a server providing Internet service. The integrity of the electronic messages are guaranteed and verifiable according to the MIME standard having a header with data regarding routing and regarding content type, an address of the sender and at least one recipient address, and a body comprising a message content. The MIME standard allows the insertion, into the header, of one or more extension fields. These fields comprise a pair formed of one tag allowing the field to be identified and of a value. The inventive method comprises the steps of receiving the electronic message, calculating an integrity value for the electronic message, storing the integrity value in a transaction of a blockchain, receiving a transaction identifier, inserting the transaction identifier as the value associated with a specific tag in an extension field in the header of the electronic message the integrity of which is to be guaranteed. The electronic message thus obtained constituting the message the integrity of which is guaranteed and verifiable.

18 Claims, 3 Drawing Sheets

(51) Int. Cl.
*H04L 51/18* (2022.01)
*H04L 51/48* (2022.01)

(56) References Cited

U.S. PATENT DOCUMENTS

| | | | |
|---|---|---|---|
| 10,600,009 B1* | 3/2020 | Augustine | H04L 9/0637 |
| 10,846,762 B1* | 11/2020 | Dennis | G06Q 20/065 |
| 10,891,621 B2* | 1/2021 | Oka | G06Q 20/3827 |
| 11,121,876 B2* | 9/2021 | Haldar | H04L 9/50 |
| 11,329,986 B2* | 5/2022 | Leahy | H04L 63/126 |
| 11,416,864 B2* | 8/2022 | Mokhasi | G06Q 20/4016 |
| 11,770,261 B2* | 9/2023 | Hamel | H04L 63/102 |
| | | | 726/6 |
| 11,785,143 B2* | 10/2023 | DiMaria | H04L 9/50 |
| | | | 713/193 |
| 11,870,747 B2* | 1/2024 | Kilburn | H04L 51/216 |
| 2003/0009694 A1* | 1/2003 | Wenocur | H04L 63/0823 |
| | | | 713/176 |
| 2017/0134326 A1* | 5/2017 | Laporta | H04L 67/01 |
| 2018/0219810 A1* | 8/2018 | Santos Ramirez | G06Q 10/107 |
| 2019/0050862 A1* | 2/2019 | Oka | G06Q 20/00 |
| 2020/0220729 A1* | 7/2020 | Hudson | H04L 9/14 |
| 2020/0410479 A1* | 12/2020 | Giralte | H04L 9/3247 |
| 2021/0075623 A1* | 3/2021 | Petersen | H04L 9/3242 |
| 2022/0086133 A1* | 3/2022 | Killoran, Jr. | H04L 51/18 |
| 2022/0150202 A1* | 5/2022 | Kilburn | H04L 9/3247 |
| 2022/0255750 A1* | 8/2022 | Amoutzias | H04L 51/212 |
| 2023/0098246 A1* | 3/2023 | Simpson | G06F 1/1632 |
| | | | 707/703 |
| 2023/0275759 A1* | 8/2023 | Majumdar | H04L 9/3239 |
| | | | 713/171 |

* cited by examiner

METHOD FOR CREATING AN ELECTRONIC MESSAGE THE INTEGRITY OF WHICH IS GUARANTEED AND VERIFIABLE ACCORDING TO THE MIME STANDARD

CROSS-REFERENCE TO RELATED APPLICATIONS

This application claims the benefit of International application number PCT/EP2020/071670, filed Jul. 31, 2020 and French patent application number 1909145, filed on Aug. 12, 2019, the entire contents of which are incorporated herein by reference.

TECHNICAL FIELD

The present invention relates to a method for creating, within a server providing an Internet service for guaranteeing the integrity of electronic messages, an electronic message the integrity of which is guaranteed and verifiable according to the MIME standard based on an electronic message according to the MIME standard comprising, according to this standard, a header comprising at least data regarding routing and regarding content type, an address of the sender and at least one recipient address, and a body comprising a message content, the MIME standard allowing the insertion, into the header, of one or more extension fields or one or more user-defined fields, these fields comprising a pair formed of at least one tag allowing identifying the field and of a value.

BACKGROUND

Currently, the electronic messages known as "email" use a standardised format called MIME for Multipurpose Internet Mail Extension. This standard is defined in particular in the following documents from the Internet Engineering Task Force standardisation authority: RFC 1521 https://tools.ietf.org/html/rfc1521 and RFC 1590 https://tools.ietf.org/html/rfc1590.

Figure 1:
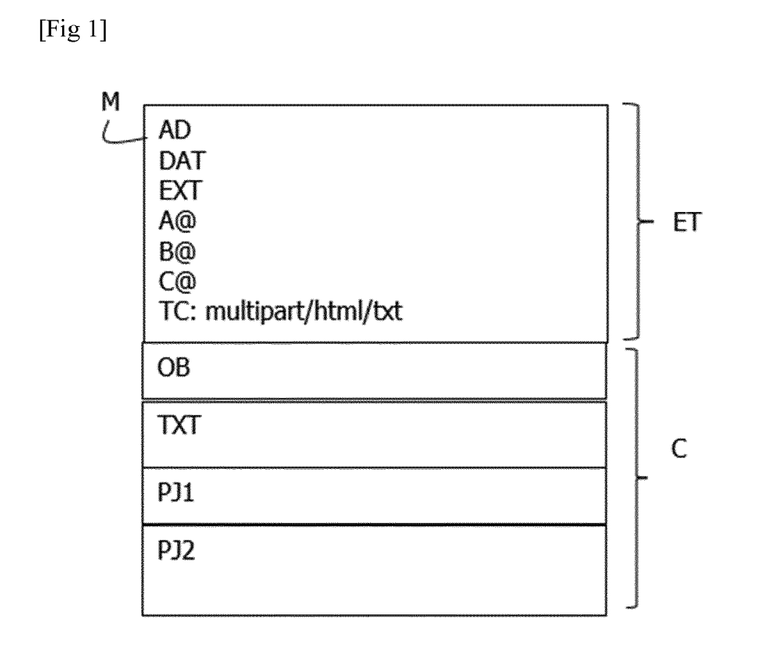
FIG. 1 schematically illustrates the structure of an electronic message, object according to the MIME standard, FIG. 2 schematically shows a method for creating an electronic message the integrity of which is guaranteed and verifiable according to the invention, FIG. 3 schematically illustrates the method for verifying the integrity of a message the integrity of which is guaranteed and verifiable according to the invention, FIG. 4 schematically illustrates a method for obtaining an integrity report by the sender according to a preferred embodiment.

FIG. 1 thus schematically describes the structure of an electronic message according to the MIME standard. The message M comprises a header ET and a body C. The header ET includes at least one sender address A@, at least one recipient address B@, possibly a copy or other recipient address C@, a content type TC and, where appropriate, one or more extension fields EXT as defined in the standard or defined by the user. The header also receives forwarding or routing data AD which fill depending on the message path as it is sent to a recipient. The sending date DAT is also part of this header ET. The body C comprises a message content which generally includes at least one of the following elements: subject of the message OB, text enriched or not TXT, attachments PJ1, PJ2.

It is well known that these emails can be easily modified during sending, or even during reception by modifying some parameters of the MIME object. This is possible in the header portion of the message, including the date, the sender and the recipient in particular, but also in the body portion of the message which includes in particular the subject of the message, the text enriched or not and the attachments.

This is detrimental to the reliability of electronic messages and makes it difficult to use them as evidence in disputes between sender and recipient. As electronic messages remain to this day the most used means between individuals, but also between professionals, there is a lack of an easy reliability tool of such electronic messages.

SUMMARY OF THE INVENTION

The main purpose of the present invention is therefore to propose a tool for making electronic messages more reliable by guaranteeing the integrity of electronic messages via a service offered online.

The invention thus consists of a method according to the background of the invention comprising the steps of:
  a. receiving the electronic message the integrity of which is to be guaranteed,
  b. calculating an integrity value for the electronic message,
  c. storing the integrity value in a transaction of a blockchain,
  d. receiving a transaction identifier,
  e. inserting the transaction identifier as the value associated with a specific tag in an extension field defined in the standard or user-defined field in the header of the electronic message the integrity of which is to be guaranteed, the electronic message thus obtained constituting the message the integrity of which is guaranteed and verifiable.

The invention thus allows guaranteeing that the MIME object has been sent to the server of the service according to the invention at the same time as to another recipient as specified in the header ET, at a timestamp defined in the message M and that it is integrated by relying on the properties of the Blockchain technology.

According to one implementation, the specific tag is a previously existing tag for an extension field provided in the MIME standard and appropriate by the method.

This implementation uses an extension field as defined in the MIME standard. This may possibly be the x-mailer tag ID of the MIME standard. However, this implementation can be weakened in the case where this extension field can be used for another reason. In this case, there is therefore a risk that the value associated with the tag will be erased by subsequent use of the tag.

Also, according to one implementation of the invention, the specific tag is a tag created specifically for the method to define an extension field defined by the user according to the MIME standard.

This implementation exploits the possibility offered by the MIME standard, for a user creating an electronic message, to define and fill an extension field.

The invention also relates to a method for verifying the integrity of an electronic message the integrity of which is guaranteed and verifiable obtained according to the method of the invention.

Thus, the invention also proposes a method for verifying the integrity of an electronic message the integrity of which is guaranteed and verifiable obtained according to the method of one of the preceding claims, within a server of an entity needing this verification, this method comprising the steps of:
  a. recovering the electronic message the integrity of which is guaranteed and verifiable,
  b. recovering the transaction identifier as being the value associated with the specific tag in the extension field or the user-defined field used by the method for creating an electronic message the integrity of which is guaranteed and verifiable of the invention,
  c. recovering the integrity value as stored in the blockchain, d. erasing the extension field or the user-defined field in the recovered electronic message,
e. calculating an integrity value on the electronic message thus obtained,
f. comparing the calculated integrity value with the recovered integrity value,
g. validating the message integrity when both integrity values are identical.

This verification method allows, as soon as the message the integrity of which is guaranteed and verifiable corresponding to an original message is available within an entity which wishes to verify the integrity of this message, the integrity of which is guaranteed and verifiable, to recalculate the integrity value based on this message and to compare it with that stored on the blockchain.

This method is very simple to implement, as the message the integrity of which is guaranteed and verifiable is made available.

The invention also relates to several uses of the method for creating a message the integrity of which is guaranteed and verifiable according to the invention, for producing an integrity report for an electronic message the integrity of which is to be guaranteed and for the obtaining of such a report by the sender.

Thus the invention also relates, in one embodiment, to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report comprising the following preliminary steps of:
  a. creating a user account by a user from the integrity guarantee network service,
  b. receiving an electronic messaging address dedicated to the integrity guarantee network service and to the user,
  c. then, when the user wants to guarantee the integrity of an electronic message, the following steps of:
  d. writing, by a sender, the electronic message the integrity of which is to be guaranteed,
  e. sending the message the integrity of which is to be guaranteed, to at least one destination electronic messaging address and to the electronic messaging address dedicated to the integrity guarantee network service and to the user, the latter sending allowing the implementation of the method for creating an electronic message the integrity of which is guaranteed and verifiable according to the invention within a server offering an integrity guarantee network service on receipt of the message at the electronic messaging address dedicated to the integrity guarantee network service and to the user,
  f. receiving an integrity report comprising at least one element allowing accessing the electronic message the integrity of which is guaranteed and verifiable according to the MIME standard created by the integrity guarantee network service.

Advantageously, this embodiment of a method for obtaining an integrity report according to the invention is such that the creation of the user account comprises the following sub-steps of:
  a. sending an electronic message to an electronic messaging address of the integrity guarantee network service,
  b. receiving an electronic message comprising a link for finalising the registration on a web page of the integrity guarantee network service,
  c. finalising the registration via the web page of the integrity guarantee network service triggering the sending of the electronic messaging address dedicated to the integrity guarantee network service to be used as recipient for the subsequent sending of electronic messages the integrity of which is to be guaranteed.

According to another embodiment, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using a messaging client, the method comprising the following preliminary steps of:
  a. creating a user account by a user from the integrity guarantee network service,
  b. installing an additional module dedicated to the integrity guarantee network service on a messaging client generating the insertion of a command dedicated to the integrity guarantee on the messaging client, the additional module being configured with an electronic messaging address dedicated to the integrity guarantee network service and to the user,
  c. then, when the user wants to guarantee the integrity of an electronic message, the following steps of:
  d. writing the electronic message the integrity of which is to be guaranteed,
  e. actuating the command dedicated to the integrity guarantee upon writing the message, which triggers, when it is activated, upon sending the message the integrity of which is to be guaranteed to at least one destination electronic messaging address, the automatic sending in parallel to the electronic messaging address dedicated to the integrity guarantee network service and to the user, for implementing the method for creating an electronic message the integrity of which is guaranteed and verifiable according to the invention,
  f. receiving an integrity report comprising at least one element allowing accessing the electronic message the integrity of which is guaranteed and verifiable according to the MIME standard created by the integrity guarantee network service.

According to another embodiment, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using a messaging client,
  the method comprising a preliminary step of configuring the messaging client with a messaging server itself offering the Internet service for guaranteeing the integrity of the electronic messages,
  then the following steps of:
  a.—writing the electronic message the integrity of which is to be guaranteed for the attention of a recipient,
  b.—sending the electronic message via the messaging server defined in the configuration of the messaging client, the latter directly sending the message to the recipient and performing itself the method for creating an electronic message the integrity of which is guaranteed and verifiable according to the invention and the construction of an integrity report, for sending to the messaging client, comprising at least one element allowing accessing the electronic message the integrity of which is guaranteed and verifiable according to the MIME standard created by the integrity guarantee network service, c.—receiving the integrity report by the messaging client.

According to another embodiment, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using an account of an Internet messaging service whose messaging servers themselves offer the Internet service for guaranteeing the integrity of the electronic messages, the method comprising, when the user wants to guarantee the integrity of an electronic message, the following steps of:

a.—writing the electronic message the integrity of which is to be guaranteed for the attention of a recipient by indicating the need for an integrity guarantee in the Internet messaging service,     b.—sending the electronic message via the messaging server, the latter sending the message directly to the recipient and itself performing the method for creating an electronic message the integrity of which is guaranteed and verifiable according to the invention and the construction of an integrity report, for sending to the user's account, comprising at least one element allowing accessing the electronic message the integrity of which is guaranteed and verifiable according to the MIME standard created by the integrity guarantee network service,     c.—receiving the integrity report in the user's account.

According to an advantageous feature, the invention relates to a method for obtaining an integrity report as described in the preceding embodiments, in which, a request for acknowledgement of receipt being added into the message the integrity of which is to be guaranteed, the obtained acknowledgement of receipt is included in the integrity report.

In another type of embodiment, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using a messaging client, the method comprising the following preliminary steps of:

a. creating a user account by a user from the integrity guarantee network service,     b. installing an additional module dedicated to the integrity guarantee network service on the messaging client generating the insertion of a command dedicated to the integrity guarantee on the messaging client, the additional module being configured with an electronic messaging address dedicated to the integrity guarantee network service to the user,     c. then, when the user wants to guarantee the integrity of an electronic message, the following steps of:

d. writing the electronic message the integrity of which is to be guaranteed,     e. upon activation of the command for sending the electronic message, before sending the message to the recipient, sending the electronic message to the electronic messaging address dedicated to the integrity guarantee network service for implementing the method for creating an electronic message the integrity of which is guaranteed and verifiable according to the invention,     f. receiving, by the additional module, the electronic message the integrity of which is guaranteed and verifiable,     g. sending, by the additional module, the electronic message the integrity of which is guaranteed and verifiable to the recipient with a request for acknowledgement of receipt,     h. receiving the acknowledgement of receipt,     i. the integrity report consisting of at least the acknowledgement of receipt and the electronic message the integrity of which is guaranteed and verifiable or the acknowledgement of receipt and an element allowing accessing the electronic message the integrity of which is guaranteed and verifiable according to the MIME standard created by the integrity guarantee network service.

In a particular embodiment, the additional module requests from the server offering the integrity guarantee service an integrity report comprising an element allowing accessing the electronic message the integrity of which is guaranteed and verifiable according to the MIME standard created by the integrity guarantee network service. In this case, the message the integrity of which is guaranteed can be recovered with this element from the service of the invention. It is noted herein that the received message the integrity of which is guaranteed can be erased in the user's device or account.

In another embodiment of the same type as the previous one, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using a messaging client, the method comprising a preliminary step of configuring the messaging client with a messaging server itself offering the Internet service for guaranteeing the integrity of the electronic messages, then, when the user wants to guarantee the integrity of an electronic message, the following steps of:

a.—writing the electronic message the integrity of which is to be guaranteed for the attention of a recipient,     b.—sending the electronic message via the messaging server defined in the configuration of the messaging client, the latter itself performing the method for creating an electronic message the integrity of which is guaranteed and verifiable according to the invention, then sending, with request for acknowledgement of receipt, the electronic message the integrity of which is guaranteed and verifiable to the recipient, receiving the acknowledgement of receipt, and finally, constructing, for sending to the messaging client, an integrity report with at least the acknowledgement of receipt and one element allowing accessing the electronic message the integrity of which is guaranteed and verifiable according to the MIME standard created by the integrity guarantee network service, c.—receiving the integrity report by the messaging client.

In another embodiment of the same type, the invention relates to a method for obtaining an integrity report for an electronic message the integrity of which is to be guaranteed from an integrity guarantee network service using a method for creating an electronic message the integrity of which is guaranteed and verifiable according to the MIME standard according to the invention, this method for obtaining an integrity report being implemented from a device of a user using an account of an Internet messaging service whose messaging servers themselves offer the Internet service for guaranteeing the integrity of the electronic messages, the method comprising, when the user wants to guarantee the integrity of an electronic message, the following steps of:

a.—writing the electronic message the integrity of which is to be guaranteed for the attention of a recipient by indicating the need for an integrity guarantee in the Internet messaging service, b.—sending the electronic message via the messaging server itself performing the method for creating an electronic message the integrity of which is guaranteed and verifiable according to the invention, this messaging server sending, with request for acknowledgement of receipt, the electronic message the integrity of which is guaranteed and verifiable to the recipient, receiving the acknowledgement of receipt, and finally, constructing, for sending to the user's account, an integrity report with at least the acknowledgement of receipt and one element allowing accessing the electronic message the integrity of which is guaranteed and verifiable according to the MIME standard created by the integrity guarantee network service, c.—receiving the integrity report in the user's account.

Advantageously, the element allowing accessing the electronic message the integrity of which is guaranteed and verifiable according to the MIME standard created by the integrity guarantee network service is the electronic message, the integrity of which is guaranteed and verifiable, itself.

Also, the element allowing accessing the electronic message the integrity of which is guaranteed and verifiable according to the MIME standard created by the integrity guarantee network service can be the transaction identifier in the blockchain, this identifier being stored associated with the message the integrity of which is guaranteed within a server allowing the verification of the integrity of the message.

The invention also relates to a server implementing the method for creating an electronic message the integrity of which is guaranteed and verifiable according to the invention. It thus relates to a server offering an Internet service for guaranteeing the integrity of the electronic messages by creating an electronic message the integrity of which is guaranteed and verifiable according to the MIME standard from an electronic message according to the MIME standard comprising, according to this standard, a header comprising at least data regarding routing and regarding content type, an address of the sender and at least one recipient address, and a body comprising a message content, the MIME standard allowing the insertion, into the header, of one or more extension fields or one or more user-defined fields, these fields comprising a pair formed of at least one tag allowing identifying the field and of a value, said server being adapted to receive electronic messages the integrity of which is to be guaranteed, said server comprising a module for calculating an integrity value from the received electronic message, said server having access to a blockchain to store the integrity value in a transaction of this blockchain, and to receive therefrom a transaction identifier, said server being adapted to insert the transaction identifier as the value associated with a specific tag in an extension field or in a user-defined field in the header of the electronic message the integrity of which is to be guaranteed, the electronic message thus obtained constituting the message the integrity of which is guaranteed and verifiable.

This server is the core of the invention, it could be inserted into one or the other of the embodiments of the methods for obtaining an integrity report.

Advantageously, this server is itself the messaging server of the sender or of the recipient.

It should be noted herein that only the embodiment in which the sender's messaging server is the server offering the service according to the invention is described in detail below, but that the embodiment where the recipient's messaging server supports the service of the invention is similar. It should be noted that the case where the recipient's server supports the method for creating the message the integrity of which is guaranteed and verifiable is advantageous insofar as the forwarding data are then those of the routing to the recipient's messaging server. This only requires that the sender's integrity guarantee request is supported by the recipient's server.

The implementation with a recipient's server offering the service according to the invention requires that this server is capable of implementing the invention. Otherwise, it will always be possible to divert the request to the server offering the integrity guarantee service according to the invention independently of the routing of the messages.

The invention also relates to a messaging client comprising an additional module dedicated to the integrity guarantee network service on a messaging client generating the insertion of a command dedicated to the integrity guarantee on the messaging client, the additional module being configured with an electronic messaging address dedicated to the integrity guarantee network service to the user, and adapted to implement the corresponding method for obtaining an integrity report of the invention.

Finally, the invention relates to a device of a user using a messaging client according to the invention.

The terms used in this document should be clarified:

a. server: be the term "server", we mean that it can be a:
  i. Messaging server (SMTP/POP/IMAP)
  ii. Voice Over IP Server
  iii. Any other server using the MIME protocol.

b. electronic message: we mean any text messages using character sets other than ASCII.

c. additional module: the additional modules presented in this document are extensions of existing messaging software (mail or instant messaging) such as:
  i. Microsoft Outlook plug-in
  ii. Gmail plug-in
  iii. Yahoo plug-in
  iv. Hotmail plug-in
  v. Or any other messaging client using the MIME protocol.

BRIEF DESCRIPTION OF THE DRAWINGS

Other features and advantages of the present invention will become apparent from the description given below, with reference to the appended drawings which illustrate an example of embodiment devoid of any limiting character. In the figures.

DETAILED DESCRIPTION

Figure 2:
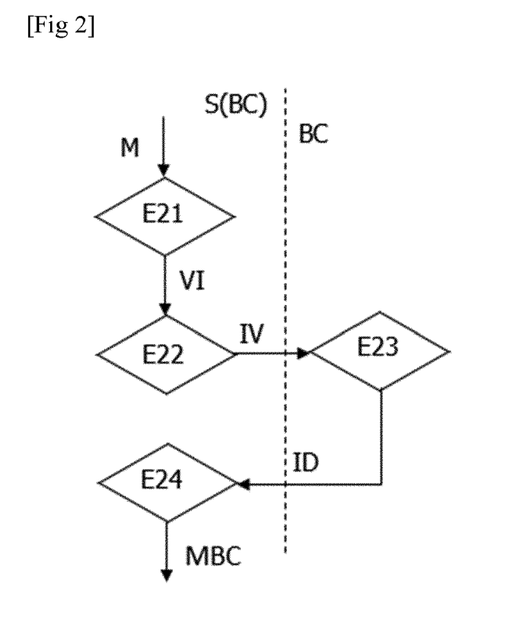

FIG. 2 schematically shows the creation of an electronic message the integrity of which is guaranteed and verifiable MB according to the invention from a message M.

Thus, according to this method, the message M is received, typically by a server S(BC) implementing the Internet service for guaranteeing the integrity of the electronic messages according to the invention.

In a first step E21, an integrity value VI of the message M is calculated. It is typically a HASH as detailed in the following description. The storage of this integrity value VI in a blockchain BC is then requested, typically by the server S(BC) in a step E22. The storage in the blockchain BC is performed in a step E23. A transaction identifier ID is then produced and sent to the server S(BC) where it is inserted as a value associated with a specific tag in an extension field in a step E24. The resulting message is the message the integrity of which is guaranteed and verifiable MB.

Figure 3:
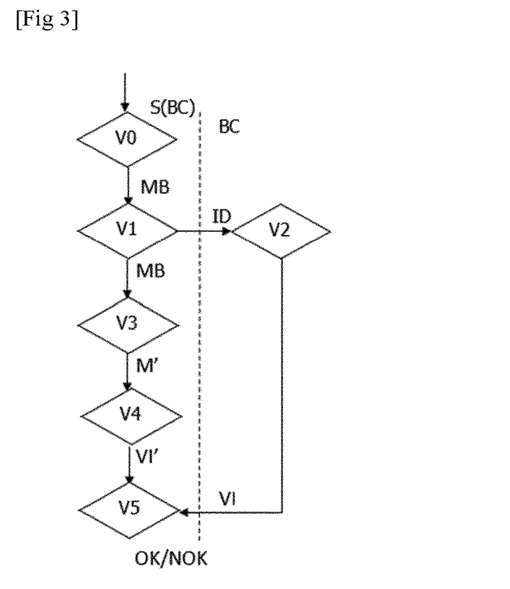

FIG. 3 schematically represents the method for verifying a message the integrity of which is guaranteed and verifiable MB according to the invention.

The verifying entity within which such a verification method is implemented is the server offering the Internet service for guaranteeing the integrity of the electronic messages itself or a server of a third party, for example a government server, or a server or a computer of a bailiff type sworn person etc.

It is necessary that this entity can have access to the blockchain BC where the transactions of the method according to the invention are stored and that it can recover the message the integrity of which is guaranteed and verifiable. This recovery can be done by receiving the message directly from the sender who would have stored the message the integrity of which is guaranteed in case where it would have been received it in the integrity report. The guaranteed integrity message can also be recovered from a server offering the integrity guarantee service according to the invention which would have stored it. In the case where the message is not directly accessible, the verifier will receive an element allowing recovering the message, from the sender in order to be able to recover the message the integrity of which is guaranteed and verifiable, typically from the integrity guarantee service. This element can be the transaction identifier itself or another identifier associated with the guaranteed integrity message or with the transaction identifier.

In the embodiment described in the Figure, in a first step V0, the verifying entity recovers the message the integrity of which is guaranteed and verifiable MB. Then, in a step V1, a transaction identifier ID is recovered by using the specific tag to recover the value within the message the integrity of which is guaranteed and verifiable.

In a step V2, this identifier ID is sent to a server hosting the blockchain BC for recovery of the integrity value VI stored in the blockchain BC.

In parallel, in a step V3, the extension field constituted by the specific tag and the associated value is erased from the message the integrity of which is guaranteed and verifiable. This leads to obtaining a message M' which is normally identical to the message M as received by the server S(BC) offering the service according to the invention in the case where its integrity has not been altered.

In the next step V4, an integrity value VI' is calculated from the message M'.

Finally, in a step V5, the integrity values as recovered in the blockchain BC and as calculated from the message M' are compared.

In the case where these integrity values VI and VI' are identical, the integrity of the message the integrity of which is guaranteed and verifiable is attested (OK case). Otherwise, it is refuted (NOK case).

Figure 4:
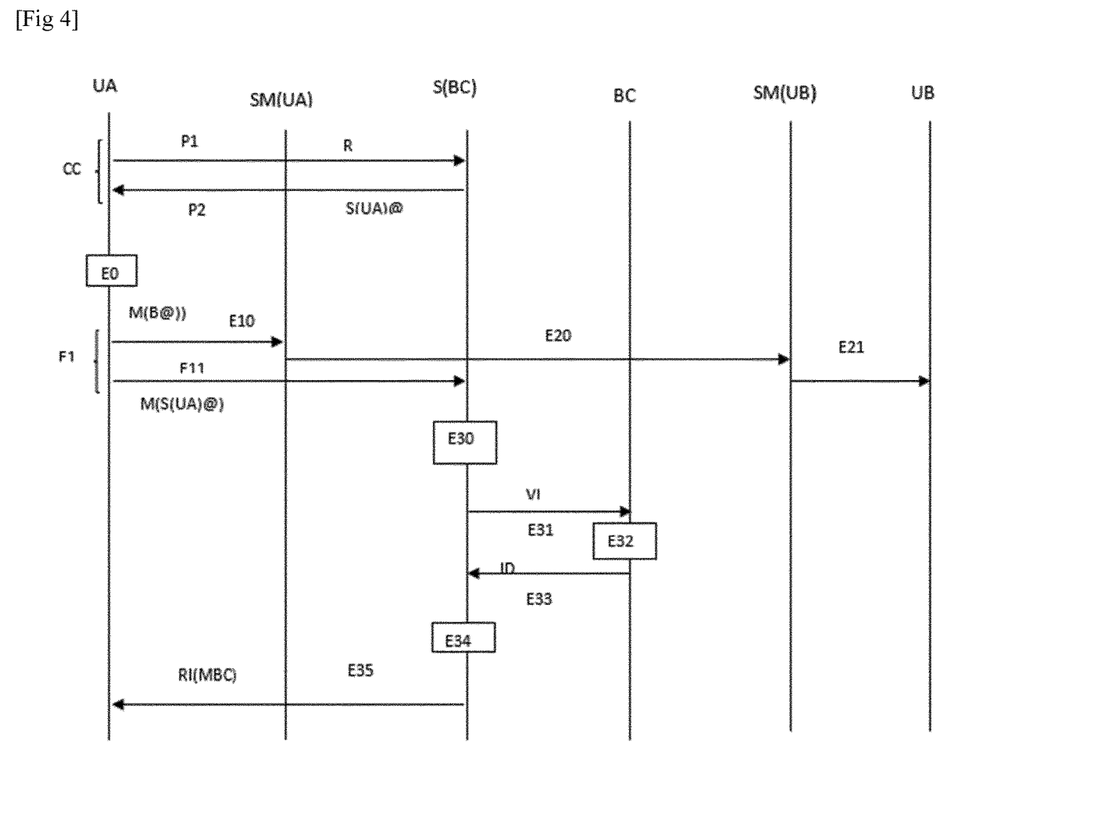

FIG. 4 schematically shows the method for obtaining an integrity report according to one embodiment of the invention.

The obtaining method comprises preliminary steps of creating CC a user account by a user UA wishing to use the integrity guarantee network service according to the invention.

The first step P1 consists in sending a user account creation request R to a server S(BC) offering the service. In response, the server S(BC) sends, in a step P2, an electronic messaging address S(UA)@ dedicated to the integrity guarantee network service and to the user UA.

In one embodiment of these preliminary account creation steps, the user advantageously simply sends an electronic message to an address of the integrity guarantee service common to all users and receives in response a link for finalising the registration pointing to a web page which, after entering the user's personal data, triggers the sending of the dedicated electronic messaging address to the integrity guarantee network service and to the user. An example of such an address is given below.

Then, the step chain leading to obtaining an integrity report is performed when the user UA wants to use the integrity guarantee service according to the invention.

In a first step E0, the user UA writes a message M(B@) the integrity of which is to be guaranteed for the attention of a user UB.

In a step E1, the user UA sends the message M(B@) to the address B@ of the user UB (step E10) by adding in the recipients or in copy the messaging address dedicated to the integrity guarantee network service and to the user C@=S(UA)@ (step E11 in FIG. 4). The message passes via a messaging server of the user UA SM(UA) to then be sent to the messaging server SM(UB) of the user UB according to a routing given in a step E20, then to the user UB in a step E21.

In parallel, the same message takes a different routing to arrive at the server offering the service according to the invention S(BC). It is therefore the data routing to the server implementing the invention that will be present in the message M(S(UA)@) to calculate, in a step E30, an integrity value according to the method for creating a message the integrity of which is guaranteed and verifiable. This integrity value VI is sent in a step E31 to a blockchain BC for storing in a step E32. In a step E33, a transaction identifier ID corresponding to the storage in the blockchain is returned to the server S(BC).

In a step E34, the identifier is inserted into the message M(S(UA)@) giving a message MBC(S(UA)@). An integrity report RI(MBC) is then sent back to the sender, this report comprising an element allowing accessing the electronic message the integrity of which is guaranteed and verifiable MBC(S(UA)@).

This element may be the guaranteed integrity message itself or a link or information allowing recovering it from the server offering the service. The transaction identifier can be this information in the case where it is the integrity guarantee service which has stored the guaranteed integrity message.

Thus more practically, if it is considered a user UA having as email address "utilisateurA@originalmail.com", wishing to send an email to a user UB "utilisateurB@originalmail.com", named MIME_ORIGINAL, the user UA puts in copy of his message to the user UB his Blockchain email address "utilisateurA@blockchainmail.com" as in the following message:

a. Received: from 6.mo69.mail-out.yyy.net (6.mo69.mail-out.yyy.net [46.105.50.107])
b. by blockchainmail.com (Postfix) with ESMTPS id 6B5203FE86
c. for <utilisateurB@originalmail.com>; Thu, 11 Jul. 2019 18:10:38+0200 (CEST)
d. Received: from player7l8.ha.ovh.net (unknown [10.109.143.223])
e. by mo69.mail-out.ovh.net (Postfix) with ESMTP id 1798F600BA
f. for <utilisateurB@originalmail.com>; Thu, 11 Jul. 2019 18:10:37+0200 (CEST)
g. Received: from originalmail.com
h. (Authenticated sender: utilisateurA@originalmail.com)
i. by player7l8.ha.ovh.net (Postfix) with ESMTPSA id 916637C48308
j. for <utilisateurB@originalmail.com>; Thu, 11 Jul. 2019 16:10:35+0000 (UTC)
k. From: <utilisateurA@originalmail.com>
l. To: utilisateurB@originalmail.com
m. Cc: utilisateurA@blockchainmail.com
n. Subject: test
o. Date: Thu, 11 Jul. 2019 18:10:32+0200
p. Message-ID: <005901d53803$2bac30e0$830492a0$@originalmail.com>
q. MIME-Version: 1.0
r. Content-Type: multipart/alternative;
s. boundary="----=_NextPart_000_005A_01D53813.EF354F00"
t. X-Mailer: Microsoft Outlook 16.0
u. Thread-Index: AdU4Ay16eu5N+M9dROSuT/HLnZLOsA==
v. Content-Language: fr
w. X-VR-SPAMSTATE: OK
x. X-VR-SPAMSCORE: 0
y. This is a multipart message in MIME format.
z. ------=_NextPart_000_005A_01D53813.EF354F00
aa. Content-Type: text/plain;
bb. charset="us-ascii"
cc. Content-Transfer-Encoding: 7 bit
dd. Test
ee. ------=_NextPart_000_005A_01D53813.EF354F00

The MIME object is therefore received by the messaging server originalmail.com and blockchainmail.com.

The messaging server originalmail.com delivers the mail (MIME_ORIGINAL) to the user UB. The messaging server blockchainmail.com performs the following operations:

a.—It calculates the HASH of the MIME_ORIGINAL object, named HASH_ORIGINAL having as value deb8c96966727f38ae7264c44a513cc68e6a761fe2f7ebe42377afc097f13924
b.—It stores in the Blockchain the HASH_ORIGINAL which returns a transaction identifier thereto containing the HASH_ORIGINAL, this transaction identifier is named BLOCKCHAIN ID
c.—This BLOCKCHAIN_ID transaction identifier is added in the header of the MIME_ORIGINAL object, giving a new MIME object named MIME_BLOCKCHAIN.

This gives the following message:
a. Received: from 6.mo69.mail-out.ovh.net (6.mo69.mail-out.yyy.net [46.105.50.107])
b. by blockchainmail.com (Postfix) with ESMTPS id 6B5203FE86
c. for <utilisateurB@originalmail.com>; Thu, 11 Jul. 2019 18:10:38+0200 (CEST)
d. Received: from player7l8.ha.yyy.net (unknown [10.109.143.223])
e. by mo69.mail-out.ovh.net (Postfix) with ESMTP id 1798F600BA
f. for <utilisateurB@originalmail.com>; Thu, 11 Jul. 2019 18:10:37+0200 (CEST)
g. Received: from originalmail.com
h. (Authenticated sender: utilisateurA@originalmail.com)
i. by player7l8.ha.ovh.net (Postfix) with ESMTPSA id 916637C48308
j. for <utilisateurB@originalmail.com>; Thu, 11 Jul. 2019 16:10:35+0000 (UTC)
k. From: <utilisateurA@originalmail.com>
l. To: utilisateurB@originalmail.com
m. Cc: utilisateurA@blockchainmail.com
n. Subject: test
o. Date: Thu, 11 Jul. 2019 18:10:32+0200
p. ID. Message-ID: <005901d53803$2bac30e0$830492a0$@originalmail.com>
q. MIME-Version: 1.0
r. Content-Type: multipart/alternative;
s. boundary="----=_NextPart_000_005A_01D53813.EF354F00"
t. X-Mailer: Microsoft Outlook 16.0
u. Thread-Index: AdU4Ay16eu5N+M9dROSuT/HLnZLOsA==
v. Content-Language: fr
w. Blockchain_ID: 68474654a654d56fbb6546cc847
x. X-VR-SPAMSTATE:OK
y. X-VR-SPAMSCORE: 0
z. This is a multipart message in MIME format.
aa. ------=_NextPart_000_005A_01D53813.EF354F00
bb. Content-Type: text/plain;
cc. charset="us-ascii"
dd. Content-Transfer-Encoding: 7 bit
ee. Test
ff. ------=_NextPart_000_005A_01D53813.EF354F00

The MIME_BLOCKCHAIN object is therefore identical to the MIME_ORIGINAL object as it arrived on the server offering the service according to the invention, apart from the addition of a new entry in the header herein named Blockchain_ID.

The messaging server blockchainmail.com calculates the hash of the MIME_BLOCKCHAIN object, named HASH_BLOCKCHAIN having the value d7ab9d810c05d3c54f847f2e9808a9f220d05e0e9c0cb1590 1b215e8b1ea82a 2.

The messaging server blockchainmail.com sends back, to the user UA, the MIME_BLOCKCHAIN object, guaranteeing the timestamp of the mail and the integrity of its content, and a proof of sending the mail MIME_ORIGINAL to the user UB.

At any time, the user UA can prove the integrity of the mail MIME_ORIGINAL (timestamp, traceability and proof of sending).

For example, the user UA sends the mail MIME_BLOCKCHAIN to the messaging server blockchainmail.com. It is noted herein that it is also possible that only the server stores the guaranteed integrity message.

The server blockchainmail.com recovers, in the header, the input BLOCKCHAIN_ID, then removes it from the header, giving the MIME_ORIGINAL object. The blockchainmail.com server calculates the HASH of the MIME_ORIGINAL object, named HASH_ORIGINAL. The server blockchainmail.com will recover the information in the blockchain from the transaction BLOCKCHAIN_ID, and recover the HASH contained in the transaction, named HASH_RECUPERE. If the HASH_RECUPERE is identical to the HASH_ORIGINAL, the messaging server blockchainmail.com sends back to the user UA the confirmation that the mail MIME_BLOCKCHAIN is indeed identical to the MIME_ORIGINAL and indeed proves its authenticity.

It is noted herein that any server or any device having the possibility of recovering the guaranteed integrity message and having a connection to the blockchain according to the invention can implement the verification of the integrity of the message.

This embodiment has the advantage of using only simple sending of electronic messages. No element needs to be added to the device of the sender to implement the method.

In another embodiment, in the case where the user uses a Microsoft Outlook or other type messaging client, an additional module is added to the messaging client. This additional module typically adds a button/command to a client ribbon. When the user activates this button when writing an electronic message before sending it, the additional module performs the automatic sending in parallel with the sending of the electronic message to the recipient. This automatic sending then triggers the step chain E1 to E35 presented above.

It is noted herein that the element allowing accessing the message the integrity of which is guaranteed and verifiable can be the message itself or a reference to the blockchain identifier or this identifier itself. In this case, it is the server offering the integrity guarantee service which keeps the message the integrity of which is guaranteed and verifiable for the user's account. This preservation can also be carried out, in some manner, in duplicate of the sending of the guaranteed integrity message to the sender. This might define several types of integrity guarantee service offers, the storage of the messages in addition by the server offering the service which may be invoiced in addition to the sending of the message the integrity of which is guaranteed and verifiable in the integrity report.

Figure 5:
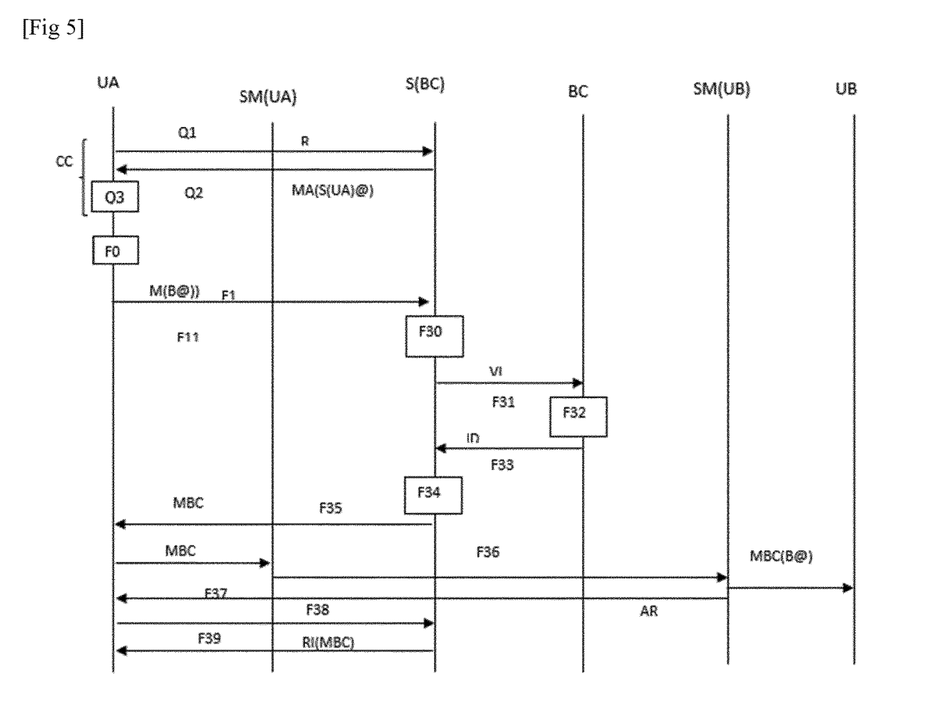
FIG. 5 schematically illustrates a method for obtaining an integrity report by a server implementing the method for creating an electronic message the integrity of which is guaranteed and verifiable according to another embodiment.

FIG. 5 describes another embodiment for obtaining an integrity report. This embodiment implements an additional module installed according to a procedure identical to the installation of the additional module according to the second embodiment described above. This installation is illustrated by three steps Q1, Q2 and Q3 in FIG. 5.

In a first step Q1, the user UA requests the creation of an account from the server S(BC) offering the service according to the invention. In response, an additional module (plug-in) MA(S(UA)@) configured with an address S(UA)@ dedicated to the service and to the user is loaded on the messaging client of the user UA, in a step Q2. Finally, in a step Q3, the additional module is installed on the messaging client.

This typically creates a button to be actuated to benefit from the service according to the invention when sending an electronic message after writing in a step E0.

When this button is pressed, when the user actuates the command of sending the message, the additional module first generates a step F1 of sending the message M(S(UA)@) to the server S(BC) offering the integrity guarantee service.

When this button is actuated, before sending the message to the recipient, it triggers the sending of the electronic message M(S(UA)@) to the electronic messaging address dedicated to the integrity guarantee network service for implementing the method for creating an electronic message the integrity of which is guaranteed and verifiable according to the invention, comprising steps F30 to F34 as described in FIG. 4. A message the integrity of which is guaranteed and verifiable MBC is then obtained and, in a step F35, this message is sent to the additional module for automatic sending with request for acknowledgement of receipt, in a step F36, to the address of recipient B@ present in the message MBC via the messaging servers SM(UA) and SM(UB).

In a step F37, an acknowledgement of receipt AR is sent to the additional module which sends it back to the server offering the service for constitution of an integrity report within this server, comprising the acknowledgement of receipt and at least one element allowing accessing the message the integrity of which is guaranteed and verifiable MBC, which is preferably the guaranteed integrity message itself. The resulting integrity report RI(MBC) is then sent to the sender.

Figure 6:
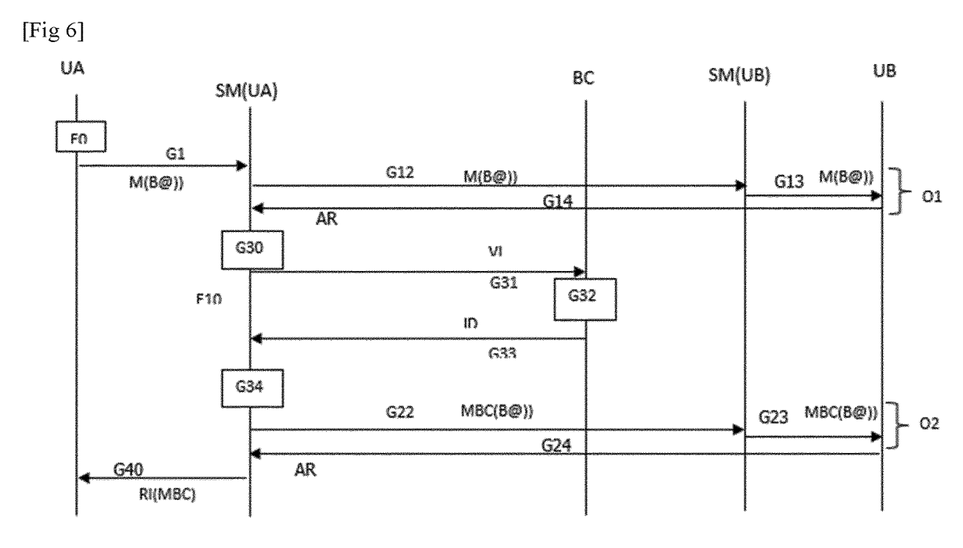
FIG. 6 schematically illustrates a method for obtaining an integrity report by a messaging server according to two other embodiments.

FIG. 6 schematically describes two other embodiments where the obtaining of an integrity report is implemented within a messaging server itself offering the integrity guarantee service according to the invention.

In these embodiments, the messaging server is connected to the user either by an internet messaging service of the gmail, yahoo or other type, or by a messaging client configured with this messaging server.

Upon receipt of a message from the user UA having sent it in a step G1, the messaging server SM(UA) calculates an integrity value in a step G30. A set of steps G30 to G34 identical to steps E30 to E34 described above and corresponding to the method for creating an electronic message the integrity of which is guaranteed and verifiable are then performed in direct collaboration of the messaging server SM(UA) with a blockchain BC.

Two options O1 and O2 are possible for the operation of the messaging server.

In the option O1, the message M(@) is sent directly to the user UB, preferably with a request for acknowledgement of receipt, via a messaging server SM(UB) of the user UB in steps G12 and G13. In the optional case where a request for acknowledgement of receipt has been emitted, an acknowledgement of receipt is sent in a step G14 to the messaging server SM(UA) which could add it to the integrity report.

This exchange of request for acknowledgement of receipt and acknowledgement of receipt is an optional action in the case where the message sent to the recipient is the original message. However, this is a preferential feature because it allows attesting the receipt of the original message by the user UB.

In the option O2, it is the message the integrity of which is guaranteed and verifiable MBC which is itself sent, after its creation according to the invention, to the address of the recipient B@ in a step G22 then G23 with a request for acknowledgement of receipt AR which is returned in a step G24 if applicable.

In both options, an integrity report RI(MBC) is then sent to the user UA on his messaging account.

Finally, it is noted that various implementations can be carried out according to the principles of the invention. In particular, it has been seen that the various features presented in the embodiments of the method for obtaining an integrity report, in particular the use of an acknowledgement of receipt, can be combined while reproducing the principles of the invention as defined in the method for creating a message the integrity of which is guaranteed and verifiable according to the invention.

What is claimed is:

1. A method for creating, within a server providing an Internet service for guaranteeing an integrity of electronic messages, an electronic message the integrity of which is guaranteed and verifiable according to a MIME standard based on an electronic message according to the MIME standard comprising, a header comprising at least data regarding routing and regarding content type, an address of a sender and at least one recipient address, and a body comprising a message content, the MIME standard allowing the insertion, into the header, of one or more extension fields as defined in the MIME standard or user-defined fields, these fields comprising a pair formed of at least one tag allowing identifying the field and of a value, the method comprising the steps of:
   a. receiving the electronic message the integrity of which is to be guaranteed,
   b. calculating a first integrity value of the electronic message,
   c. storing the first integrity value in a transaction of a blockchain,
   d. receiving a transaction identifier,
   e. inserting the transaction identifier as the value associated with a specific tag in an extension field defined in the MIME standard or user-defined field in the header of the electronic message the integrity of which is to be guaranteed, the electronic message thus obtained constituting the electronic message the integrity of which is guaranteed and verifiable.

2. The method according to claim 1, wherein the specific tag is a tag created specifically for the method to define a user-defined extension field according to the MIME standard.

3. The method according to claim 1, comprising the steps of:
   a. recovering the electronic message the integrity of which is guaranteed and verifiable, recovering the transaction identifier as being the value associated with the specific tag in the extension field or the user-defined field,
   b. recovering the first integrity value as stored in the blockchain,
   c. erasing the extension field or the user-defined field in the recovered electronic message,
   d. calculating a second integrity value on the electronic message thus obtained,
   e. comparing the calculated second integrity value with the recovered first integrity value,
   f. validating the electronic message integrity when both first and second integrity values are identical.

4. The method according to claim 1 comprising:
   a. creating a user account by a user from an integrity guarantee network service,
   b. receiving an electronic messaging address dedicated to the integrity guarantee network service and to the user,
   c. writing, by a sender, the electronic message the integrity of which is to be guaranteed,
   d. sending the electronic message the integrity of which is to be guaranteed, to at least one destination electronic messaging address and to the electronic messaging address dedicated to the integrity guarantee network service and to the user, to implement the method for creating an electronic message the integrity of which is guaranteed and verifiable within a server offering an integrity guarantee network service on receipt of the electronic message at the electronic messaging address dedicated to the integrity guarantee network service and to the user,
   e. receiving an integrity report comprising at least one element allowing accessing the electronic message the integrity of which is guaranteed and verifiable according to the MIME standard created by the integrity guarantee network service.

5. The method according to claim 4, wherein the creation of the user account comprises:
   a. sending an electronic message to an electronic messaging address of the integrity guarantee network service,
   b. receiving an electronic message comprising a link for finalising a registration on a web page of the integrity guarantee network service,
   c. finalising the registration via the web page of the integrity guarantee network service triggering the sending of the electronic messaging address dedicated to the integrity guarantee network service to be used as recipient for subsequent sending of electronic messages the integrity of which is to be guaranteed.

6. The method for obtaining an integrity report according to claim 4, wherein, a request for acknowledgement of receipt being added into the electronic message the integrity of which is to be guaranteed, the acknowledgement of receipt is included in the integrity report.

7. The method according to claim 1 comprising the steps of:
   a. creating a user account by a user from an integrity guarantee network service,
   b. installing an additional module dedicated to the integrity guarantee network service on a messaging client generating an insertion of a command dedicated to the integrity guarantee on the messaging client, the additional module being configured with an electronic messaging address dedicated to the integrity guarantee network service to the user,
   c. writing the electronic message the integrity of which is to be guaranteed,
   d. actuating a sole command to send simultaneously and in parallel the electronic message to be verified, to at least three different electronic addresses including (i) the destination electronic messaging address (ii) the electronic messaging address dedicated to the integrity guarantee network service, and (iii) to the electronic address of the user for implementing the method for creating an electronic message the integrity of which is guaranteed and verifiable,
e. receiving an integrity report comprising at least one element allowing accessing the electronic message the integrity of which is guaranteed and verifiable according to the MIME standard created by the integrity guarantee network service.

8. The method according to claim 1 comprising:
a.—configuring a messaging client with a messaging server offering the Internet service for guaranteeing the integrity of the electronic messages,
b.—writing the electronic message the integrity of which is to be guaranteed for an attention of a recipient,
c.—sending the electronic message via the messaging server defined in a configuration of the messaging client, the messaging server directly sending the electronic message to the recipient and performing the method for creating an electronic message the integrity of which is guaranteed and verifiable and a construction of an integrity report, for sending to the messaging client, comprising at least one element allowing accessing the electronic message the integrity of which is guaranteed and verifiable according to the MIME standard created by the integrity guarantee network service,
d.—receiving the integrity report by the messaging client.

9. The method according to claim 1, further comprising:
a.—writing the electronic message the integrity of which is to be guaranteed for an attention of a recipient by indicating a need for an integrity guarantee in the Internet service,
b.—sending the electronic message via the messaging server, the messaging server sending the electronic message directly to the recipient and performing the method for creating an electronic message the integrity of which is guaranteed and verifiable and a construction of an integrity report, for sending to a user's account, comprising at least one element allowing accessing the electronic message the integrity of which is guaranteed and verifiable according to the MIME standard created by an integrity guarantee network service,
c.—receiving the integrity report in the user's account.

10. The method according to claim 1 further comprising the steps of:
a. creating a user account by a user from an integrity guarantee network service,
b. installing an additional module dedicated to the integrity guarantee network service on the messaging client generating an insertion of a command dedicated to the integrity guarantee on the messaging client, the additional module being configured with an electronic messaging address dedicated to the integrity guarantee network service to the user,
c. writing the electronic message the integrity of which is to be guaranteed,
d. upon activation of the command for sending the electronic message, before sending the electronic message to the recipient, sending the electronic message to the electronic messaging address dedicated to the integrity guarantee network service for implementing the method for creating an electronic message the integrity of which is guaranteed and verifiable,
e. receiving, by the additional module, the electronic message the integrity of which is guaranteed and verifiable,
f. sending, by the additional module, the electronic message the integrity of which is guaranteed and verifiable to the recipient with a request for acknowledgement of receipt,
h. receiving the acknowledgement of receipt,
g. the integrity report consisting of at least the acknowledgement of receipt and the electronic message the integrity of which is guaranteed and verifiable or the acknowledgement of receipt and an element allowing accessing the electronic message the integrity of which is guaranteed and verifiable according to the MIME standard created by the integrity guarantee network service.

11. The method according to claim 1 comprising:
a. configuring a messaging client with a messaging server itself offering the Internet service for guaranteeing the integrity of the electronic messages,
b. writing the electronic message the integrity of which is to be guaranteed for an attention of a recipient,
c.—sending the electronic message via the messaging server defined in a configuration of the messaging client, the messaging client itself performing the method for creating an electronic message the integrity of which is guaranteed and verifiable, then sending, with request for acknowledgement of receipt, the electronic message the integrity of which is guaranteed and verifiable to the recipient, receiving the acknowledgement of receipt, and finally, constructing, for sending to the messaging client, an integrity report with at least the acknowledgement of receipt and one element allowing accessing the electronic message the integrity of which is guaranteed and verifiable according to the MIME standard created by the integrity guarantee network service,
d.—receiving the integrity report by the messaging client.

12. The method according to claim 1 comprising:
a.—writing the electronic message the integrity of which is to be guaranteed for an attention of a recipient by indicating the need for an integrity guarantee in the Internet messaging service,
b.—sending the electronic message via a messaging server performing the method for creating an electronic message the integrity of which is guaranteed and verifiable, the messaging server sending, with request for acknowledgement of receipt, the electronic message the integrity of which is guaranteed and verifiable to the recipient, receiving an acknowledgement of receipt, and finally, constructing, for sending to a user's account, an integrity report with at least an acknowledgement of receipt and one element allowing accessing the electronic message the integrity of which is guaranteed and verifiable according to the MIME standard created by the integrity guarantee network service,
c.—receiving the integrity report in the user's account.

13. The method according to claim 12, wherein the element allowing accessing the electronic message the integrity of which is guaranteed and verifiable according to the MIME standard created by the integrity guarantee network service is the electronic message, the integrity of which is guaranteed and verifiable.

14. The method according to claim 12, wherein the element allowing accessing the electronic message the integrity of which is guaranteed and verifiable according to the MIME standard created by the integrity guarantee network service is the transaction identifier in the blockchain, the transaction identifier being stored associated with the electronic message the integrity of which is guaranteed within a server allowing verification of the integrity of the electronic message.

15. A server offering Internet services for guaranteeing an integrity of the electronic messages by creating an electronic message an integrity of which is guaranteed and verifiable according to a MIME standard from an electronic message according to the MIME standard comprising, a header comprising at least data regarding routing and regarding content type, an address of a sender and at least one recipient address, and a body comprising an electronic message content, the MIME standard allowing the insertion, into the header, of one or more extension fields or one or more user-defined fields, these fields comprising a pair formed of at least one tag allowing identifying the field and of a value, the server being adapted to receive electronic messages an integrity of which is to be guaranteed, the server comprising a module for calculating an integrity value from the received electronic message, the server having access to a blockchain to store an integrity value in a transaction of the blockchain, and to receive therefrom a transaction identifier, said server being adapted to insert the transaction identifier as the value associated with a specific tag in an extension field or in a user-defined field in the header of the electronic message an integrity of which is to be guaranteed, the electronic message obtained constituting the electronic message the integrity of which is guaranteed and verifiable.

16. The server according to claim 15, wherein the server is the messaging server of the sender or of the recipient.

17. The method according to claim 6 further comprising a second module dedicated to the integrity guarantee network service on a messaging client generating the insertion of a command dedicated to the integrity guarantee on the messaging client, the second module being configured with an electronic messaging address dedicated to the integrity guarantee network service to the user.

18. A device of a user configured to perform the method according to claim 17.

* * * * *